United States Patent [19]

Watkins, Jr.

[11] 3,826,489

[45] July 30, 1974

[54] TAPE CASSETTE

[75] Inventor: Louis W. Watkins, Jr., Cambridge, Mass.

[73] Assignee: Data Packaging Corporation, Cambridge, Mass.

[22] Filed: June 14, 1973

[21] Appl. No.: 370,034

Related U.S. Application Data

[62] Division of Ser. No. 109,249, Jan. 25, 1971, abandoned.

[52] U.S. Cl. .................... 360/132, 242/74, 242/76, 242/199, 360/60

[51] Int. Cl. ........................ G11b 23/10, B65h 75/28

[58] Field of Search .......... 274/4 C, 4 E, 4 H, 11 C, 274/4 D; 179/100.2 Z, 100.2 ZA; 242/199, 200, 198, 197

[56] References Cited

UNITED STATES PATENTS

| | | | |
|---|---|---|---|
| 2,612,565 | 9/1952 | Heller | 274/4 C |
| 3,416,150 | 12/1968 | Lindberg, Jr. | 274/4 H X |

*Primary Examiner*—George F. Mautz
*Attorney, Agent, or Firm*—Wolf, Greenfield & Sacks

[57] ABSTRACT

This disclosure relates to improvements in the construction and operation of tape cassettes of the type which are adapted to be received in a recording and/or playback device. One aspect of the disclosure relates to an arrangement by which a sensor in the recording/playback device may be actuated in response to insertion of the cassette into the device to control operation of the recording circuitry in the recording device. The recording or non-recording mode is selected by a switchable member on the cassette itself which determines whether or not the sensor in the device is or is not actuated.

Also disclosed is an improved arrangement for mounting the pressure pad which maintains the tape loop in firm engagement with the transducer in the recording/playback device. A pair of pressure pads are provided on a specially constructed leaf spring which, when engaged by the head, are wrapped about the head and maintain full and firm contact between the tape loop and the head. The construction of the leaf spring also avoids any tendency for the spring and pad to shift laterally with respect to the head thus orienting the pressure pads properly at all times.

The disclosure further includes improved arrangements for retarding variation in the heightwise position of the tape between the walls of the cassette so that as the tape is wound onto the reel in the cassette, it will do so evenly and smoothly and without forming any high spots. This is achieved by a specially formed sheet on the internal surface of the top and bottom cassette walls, the sheet having resilient, inwardly extending bumps which engage continually the edges of the tape. Even winding of the tape is enhanced further by providing a guide roller in each of the four corners of the cassette and biasing the guide rollers axially toward one or the other of the cassette walls. The provision of a guide roller in each of the cassette corners also minimizes any tendency for tape skew.

Also included in the disclosure is an improved construction for the tape reels about which the tape is wound which avoids the formation of any flats or creases on the wound tape.

The disclosure further includes an arrangement for the outer surface of the cassette which permits a label or the like to be imprinted directly on the cassette thus avoiding the requirement for separate printed labels which thereafter must be bonded to the outer surface of the cassette.

9 Claims, 11 Drawing Figures

INVENTOR
Louie W. Watkins, Jr.
BY
Wolf, Greenfield & Sacks
ATTORNEYS

INVENTOR

Louie W. Watkins, Jr.

BY

Wolf, Greenfield & Sacks

ATTORNEYS

TAPE CASSETTE

This application is a division of application Ser. No. 109,249, filed Jan. 25, 1971, now abandoned.

BACKGROUND OF THE INVENTION

This invention relates to tape cassettes of the type which may be employed in magnetic recording having a pair of reels rotatably supported within the cassette and a finite length of tape which is secured at its ends to the reels. As the reels are driven, the tape is transferred from one reel to the other to form a loop which spans the two reels. The loop is exposed through appropriate openings formed in the cassette to permit the loop to be engaged by an appropriate transducer such as a recording/playback head and by a tape drive mechanism.

Although cassettes of this general type have been used widely, they are not entirely free from difficulties. For example, in some instances it is desirable to record certain information on the tape in the cassette and thereafter insure that the recorded information is not erased inadvertently at a later time. For this purpose, recording/playback devices often are provided with a sensor which is engaged by a tab portion of the cassette when the cassette is inserted into the recording/playback device. Actuation of the sensor by its engagement with the tab on the cassette controls the recording circuitry and mechanism in the device to permit operation of the recording mechanism. The sensor-engaging tab is of relatively fragile construction to enable the tab to be broken away from the cassette easily. When the tab is removed, the sensor cannot be actuated and the recording circuitry of the machine will be inoperative to insure that the information recorded on the tape will not be destroyed. Although this arrangement does serve its initial function of precluding erasure of particular recorded material, removal of the sensor-actuating tab is permanent and the cassette cannot be used again to record subsequent information. One of the objects of the invention is to provide a cassette having an arrangement for selectively actuating the sensor in the machine in response to insertion of the cassette yet which also permits the cassette to be switched reversably between a recording and non-recording mode.

Also among the difficulties presented in prior cassettes is the arrangement of the pressure pad which biases the tape loop firmly against the transducer in the machine such as a recording/playback head. One of the more common arrangements for supporting and biasing the pressure pad is to mount the pressure pad on a resilient leaf spring which is designed to bias the tape against the transducer when the cassette is inserted into the machine. Because most machines include transducers having convex surfaces which engage the tape loop, the pressure pads tend to press the tape only against a portion of the transducer and not along its full head surface. Additionally, because the leaf spring on which the pressure pad is mounted ordinarily must flex as the pressure pad engages the transducer, the leaf spring must be mounted in a manner which permits limited shifting movement of the spring when in an unflexed condition. This, in turn, results sometimes in a shifting of the position of the pressure pad in relation to the transducer so that proper registration of the pressure pad and transducer may not always be assured. The invention includes an improved arrangement for supporting the pressure pad whic overcomes these difficulties.

Cassettes of the type described generally are of flat configuration, and some clearance does exist between the edges of the tape and the inner surfaces of their associated top and bottom walls of the cassette. The clearance provides freedom of motion for the tape but also permits limited heightwise movement of the tape between the top and bottom walls. This may result in heightwise chatter or uneven winding of the tape on one of the reels. Such uneven winding of the tape may result in the formation of high spots on the wound reel. These high spots tend to rub against the inner surfaces of the cassette walls thus increasing friction and reducing the efficiency and accuracy fo the cassette. The invention includes features adapted to eliminate heightwise chatter of the tape and uneven wrapping of the tape about the reels.

Still another difficulty encountered frequently in cassettes is the formation of a flat spot at the same general location on each coil of the wound tape. This is caused by the construction of the reel which includes a slot formed at its periphery to receive and engage the end of the tape. As subsequent coils of the tape are wound about the reel, they tend to flatten out in the region of the slot. These flattened portions of each coil are repeated with each winding and tend to form slight creases in the tape. The creases thus formed reduce the smooth operating characteristics of the cassette and, in some instances, as when the cassette is employed to record digital information, may result in erroneous recording or playback signals.

Cassettes of the type described ordinarily are provided with labels along at least one surface to facilitate identification of the particular cassette or the information recorded on its tape. Ordinarily, the labels are imprinted separately and are bonded to the surface of the cassette in a depressed region formed at that surface so that when the label is in place, the outer surface of the cassette will appear smooth. Although this technique does serve its purpose it is relatively expensive in that the labels must be separately printed and then attached to the outer surface of the cassette. The instant invention provides a more efficient and economical technique for forming identifying labels on the outer surface on the cassettes.

SUMMARY OF THE INVENTION

The invention is embodied in a cassette of generally standard configuration having broad top and bottom walls, front and rear walls and sidewalls. The tape loop is passed within the cassette along the front wall which has appropriate openings formed therein to receive the transducer head for engagement with the tape loop. The rear wall of the cassette includes an opening which is receptive to the sensor in the machine which controls operation of the recording circuitry. The sensor is movable rearwardly in the machine in response to a rearwardly directed force. The opening in the rear wall of the cassette normally is closed by a light, resilient leaf spring which is engaged by the sensor when the cassette is inserted into the machine. The spring force of the leaf spring is insufficient to urge the sensor rearwardly so that when the cassette has been inserted fully, the leaf spring will merely flex inwardly and the recording circuit of the machine will remain operative. Means are provided in the cassette for locking the leaf spring in its window-closing position so that when it engages the sensor, it will urge the sensor rearwardly to render the recording apparatus inoperative.

Another aspect of the invention relates to the arrangement for supporting the pressure pads which urge the tape loop firmly about the transducer head. This arrangement includes a resilient leaf spring which is secured rigidly at its ends to the cassette and which is exposed through the transducer-receiving opening in the forward wall of the cassette. The leaf spring is formed with an enlarged rearwardly projecting arch which tends to expand when the spring is bowed inwardly in response to engagement of the cassette in the machine. A separate pressure pad is provided on the spring on each side of the arch. When the cassette is in the machine, the transducer tends to bow the spring inwardly into the cassette which causes the pads to cant inwardly toward each other and follow the general convex contour of the transducer head. Additionally, because the ends of the leaf spring are secured at all times, the spring and pressure pads always will return to the same initial position and any tendency for the spring and pads to shift position in relation to the transducer is avoided.

A further aspect of the invention relates to the arrangement for reducing heightwise chatter of the tape and uneven wrapping of the tape about either of the reels. Heightwise movement of the tape throughout its path of travel through the cassette may be eliminated substantially by the inclusion of a flexible, resilient sheet of material having a number of resilient bumps formed therein which extend inwardly toward the center of the cassette and engage the edges of the advancing tape. The sheets may be located at the internal surface of either or both of the cassette walls to bias the tape toward one of the walls or in an intermediate position between the walls. The tape engaging surfaces of the bias sheet may be coated with a thin film of low friction material such as Teflon.

Still another aspect of the invention relates to an improved reel construction which avoids the formation of any flats or creases in the tape as it is wound on the reel. The reel is formed from two disc-like parts which are formed to define interlocking wedging surfaces when brought together. The wedged surfaces are effective to grip the end of the tape firmly without presenting any gaps or discontinuity in the outer winding surface of the reel.

A further aspect of the invention relates to the configuration of the outer surface of the top and bottom walls in which the usual depressed region for the label is omitted. Instead, the outer surface of the wall is substantially flat except for a few depressed surfaces which are not intended to be provided with any labelling. This configuration enables the cassette to be run directly through a printing apparatus which can imprint the desired label on cassettes in rapid sequence and at considerably reduced cost.

Among the primary objects of the invention is to provide an improved cassette having self-contained means for precluding operation of the recording circuitry in a recording/playback machine, which self-contained arrangement may be reversed to permit such recording.

A further object of the invention is to provide an improved cassette in which the pressure pad maintains the tape loop in firm full engagement with the transducer head in the recording/playback machine and in which the pressure pad cannot shift out of its intended position.

Another object of the invention is to provide an improved cassette in which the likelihood of heightwise tape chatter or uneven winding on the tape reel is avoided.

A further object of the invention is to provide an improved construction for a tape reel in a cassette in which the development of falts or creases in the wound tape is avoided. Still another object of the invention is to provide a cassette which may be labeled simply and economically by a simplified labelling technique.

DESCRIPTION OF THE DRAWINGS

These and other objects and advantages of the invention will be understood more fully from the following detailed description thereof, with reference to the accompanying drawings wherein.

DESCRIPTION OF THE PREFERRED EMBODIMENT

Figure 1:
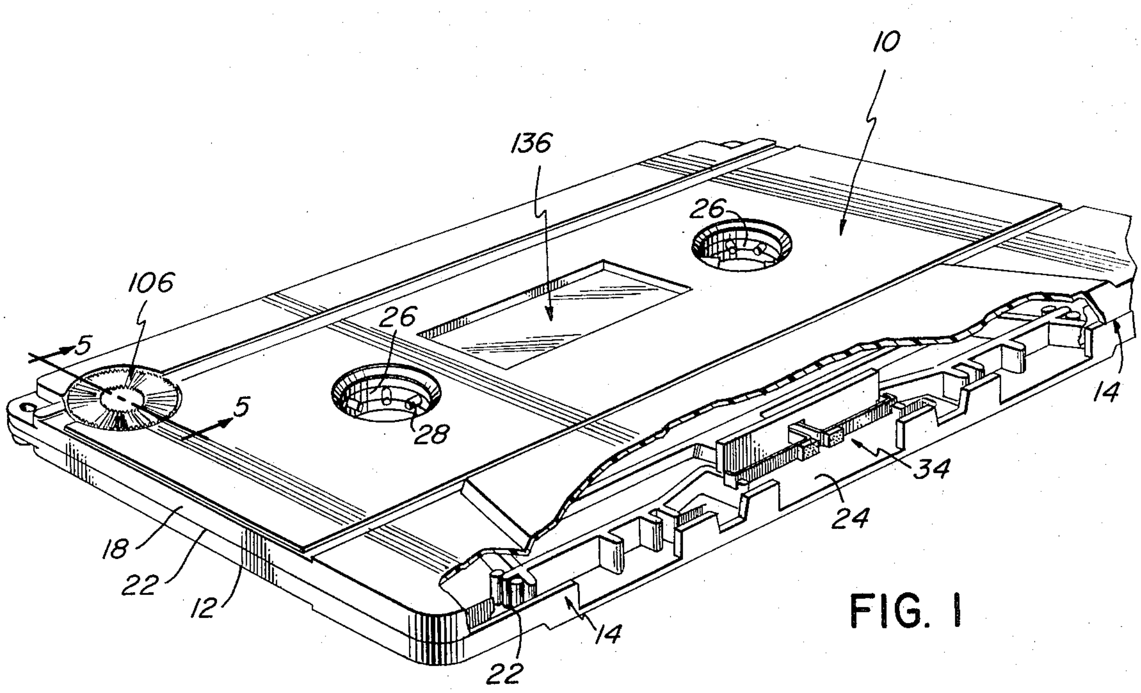
FIG. 1 is a perspective view of the cassette, partly broken away to show selected portions of the interior of the cassette.

FIG. 1 shows the cassette having broad, spaced top and bottom walls 10, 12, a front wall 14, a rear wall 16 and sidewalls 18, 20. The cassette is formed from a pair of molded plastic halves, each of which includes the top or bottom wall and half of each of the front, rear and sidewalls. The halves are joined together along the separation line 22 as shown by conventional bonding techniques. The front wall 14 is formed with a number of openings, one of which includes the opening 24 which receives the transducer in the machine such as a magnetic recording/playback head.

The cassette contains a pair of reels 26 which are rotatably supported about bosses formed on the internal surface of the top and bottom walls which retain the reels 26 rotatably in place. The reels 26 include the conventional radially, inwardly projecting teeth 28 which are engagable by appropriate reel spindles in the recording machine. Each end of the tape 30 is secured to one of the reels so that the tape may be wound from one reel to the other. The unwound loop portion of the tape extending between the reels is guided by rollers 32, along the inner surface of the front wall 14 and past the opening 24.

Figure 2:
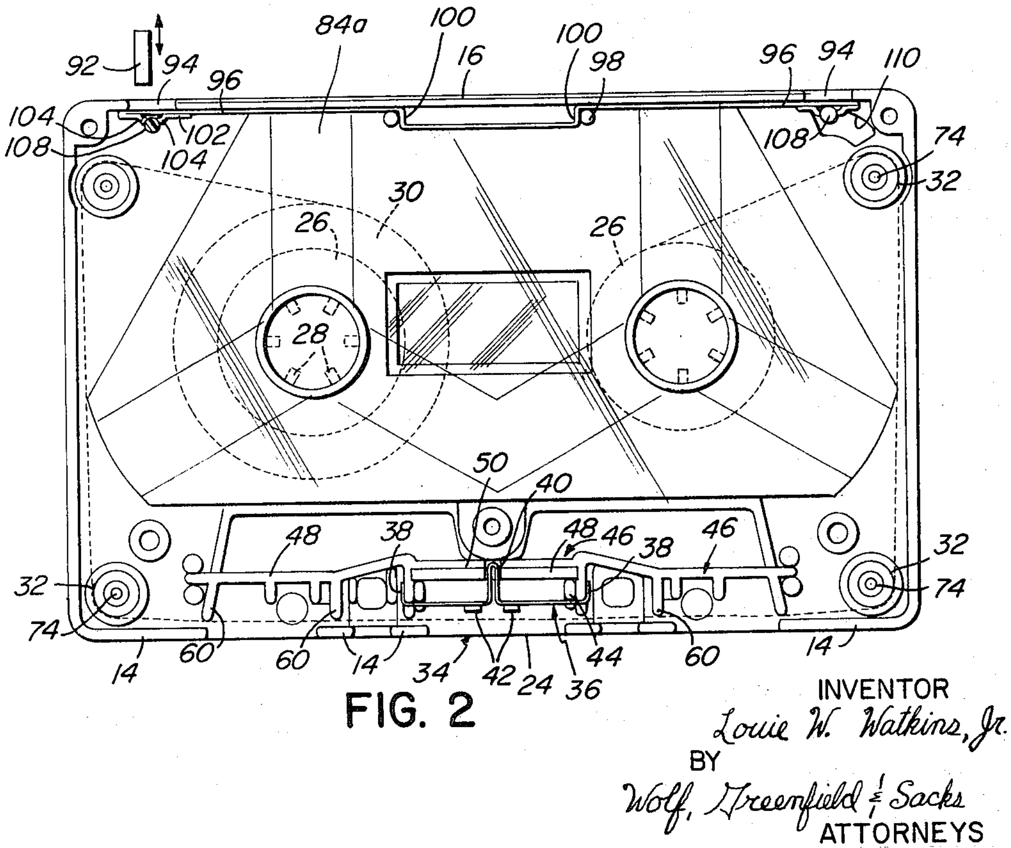
FIG. 2 is a plan view of the interior of the cassette with the top wall removed.

One aspect of the invention relates to an improved pressure pad unit 34 which is mounted within the cassette behind the tape loop and in registry with the opening 24 to press firmly the tape against the transducer head in the machine. As shown in FIG. 2, the pressure pad unit 34 includes thin, resilient spring 36 having its ends bent rearwardly to form tabs 38. The mid-portion of the spring is formed to define a rearwardly extending arch 40 and a pressure pad 42 is fastened to the forward face of the spring on each side of the arch 40 and in proximity to the arch. The ends of the spring 36 are retained in the position shown by an appropriate combination of studs 44 and brackets 46 which may be molded integrally with the top and bottom walls of the cassette. The studs 44 and brackets 46 also include appropriately formed surfaces which receive and support a magnetic shield 48 behind and in parallel to the spring 36. The magnetic shield 48 includes a hole 50 formed therein to receive the rearward bight of the arch 40 and to permit the arch to pass rearwardly therethrough as explained more fully below. The bracket 46 also may include an opening in registry with the hole 50 in the magnetic shield 48 to permit rearward flexing of the arch 40.

Figure 3:
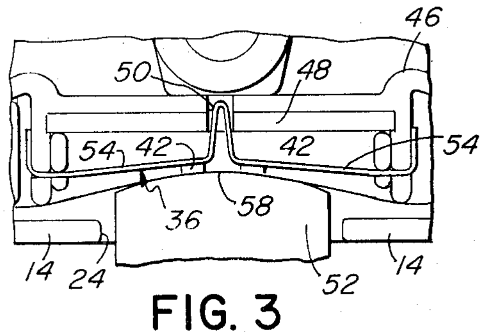
FIG. 3 is a plan view of the pressure pad arrangement when flexed and in engagement with the recording/playback head of the machine.

FIG. 3 shows the configuration of the pressure pad unit when the cassette is engaged properly with the recording/playback machine transducer head 52 pressing firmly against the pressure pads 42 to grip the tape loop therebetween. Thus, because the ends of the spring 36 are retained firmly, the transducer head 52 causes the arms 54 of the spring 36 to swing inwardly with the arch being urged rearwardly through the hole 50 in the shield 48. The arch expands and the pads 42 are urged to a more separated position. Additionally, the inward swinging movement of the arms 54 cause the forwardly facing, tape-engaging surfaces of the pads 42 to bear directly against the tape and convex surface 58 of the transducer head 52. This arrangement is effective to maintain the tape in firm and full engagement along the convex surface of the transducer head. Additionally, because the ends of the spring 36 are retained firmly, the spring and pads 42 will return to their original, proper position and will not tend to become displaced from that position along the direction of tape advancement.

The bracket 46 may include a number of integrally formed fingers 60 which are spaced along its length and along the length of the front wall 14. The ends of the fingers 60 serve as tape guides to support and guide the tape as it is advanced along and behind the front wall 14.

The tape is guided from the reels 26 past the front wall 14 by a plurality of guide rollers 32 which are rotatably mounted within and near each corner of the cassette. Prior cassettes characteristically have employed only two such rollers at the forward corners. By employing a roller in each corner, the tape is guided and supported more firmly which reduces any tendency of the tape to assume any improper attitudes as it passes from one reel to the other. In particular, by providing a guide roller 34 in each of the four corners of the cassette the effective path through which the tape travels from one reel toward the opening 34 is lengthened substantially. This tends to reduce any tendency for tape skew in relation to the tape head. Each of the guide rollers is rotatably supported about a pin 74 which is retained, at its ends, in receptive sockets formed at the internal surface of the top and bottom walls 10, 12.

Figure 6:
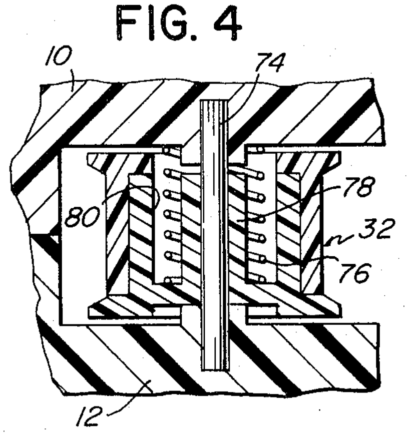
FIG. 6 is an enlarged sectional elevation through one of the tape supporting rollers as seen along the lines 6—6 of FIG. 2.

One of the more common problems encountered in cassettes is that the tape may tend to move heightwise within the cassette within the limits defined by the space between the top and bottom walls 10, 12. In those instances where precise registration of the tape with the transducer 52 is essential, as in some computer applications, heightwise displacement of the tape may produce undesirable results. Additionally, any tendency of the tape to assume various heights as it is wound onto one of the reels results in the formation of high spots on the wound reel. These high spots may rub against the internal surface of the top or bottom wall 10, 12 which reduces materially the smooth operation of the cassette. Although a number of factors may cause heightwise chattering of the tape, one such factor is the clearance which is provided between the tape guide rollers 32 and the internal surfaces of the top and bottom walls 10, 12. In some instances the rotating rollers 32 may tend to climb up and down their respective pins 74 thus inducing heightwise chatter of the tape. This is avoided in part by biasing the guide rollers 32 toward either the top or bottom wall 10, 12. As shown in FIG. 6, this may include a simple helical spring 76 which surrounds the central hub 78 of the roller 32 and is retained within a generally annular socket 80 in the roller 32. The free end of the helical spring 76 bears against one of the walls of the cassette. Thus, as shown, the rollers 32 are biased lightly toward the bottom wall 12 in the cassette.

Figure 7:
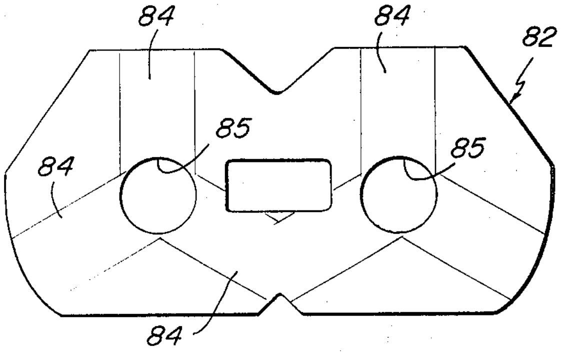
FIG. 7 is an illustration of the internal sheet for retarding variation in the heightwise position of the tape.
Figure 8:
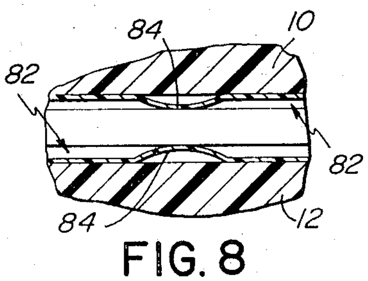
FIG. 8 is a sectional view of the cassette having resilient sheets to guide the tape with the clearance between the tape, top and bottom walls exaggerated for clarity.

In accordance with the invention, the support for the tape during its travel from one reel to the other is enhanced further to maintain the tape in a substantially fixed, heightwise position between the top and bottom walls of the cassette. In particular, this is done while the tape is being wound onto one or the other of the tape reels 26. This is achieved by lining the inner surface either or both of the top and bottom walls 10, 12 with a sheet of thin, resilient material having specially formed bumps which engage the edge of the tape. I have found that a thin sheet of Mylar which has been molded to the desired configuration to be quite satisfactory. As shown in FIGS. 7 and 8, the bias sheet 82 is formed with a plurality of inwardly projecting bumps 84 which bear lightly and resiliently against their adjacent edge of the tape. The bumps preferably are circumferentially spaced about each of the holes 85 in the sheet 82, for example, as shown, where three such radially extending pumps are spaced about each hole 85. The bumps 84 should be arranged so as the tape passes from one of the rearward guide rollers 32 onto the take-up reel, the tape engages one of the bumps 84 at the point of tangency of the tape with the reel onto which it is being wound. Thus, as suggested in FIG. 2, the bump **84*a* extends in a substantially rearward direction and is arranged so that the tape winding onto the take-up reel (the left reel as seen in FIG. 2) is supported by the bump 84*a*** about the point of tangency with the partially wound up tape. Although the angle that the tape may make with the bump 84 will vary as the tape is progressively wound, the bump should be dimensioned so that it will support effectively the tape near the point of tangency throughout the duration of the tape wind-up. By providing support for the tape at the point of tangency, it is insured that the tape will be wound evenly about the reel without forming any high spots. In the preferred embodiment of the invention, at least the tape-engaging regions of the sheet 82 are coated with a thin film of low-friction material such as Teflon. The cassette may be formed to include the sheet 82 at one or both internal surfaces of the top and bottom walls 10, 12. When both walls are covered, the tape will tend to float between the sheets but at a constant heightwise level as shown in FIG. 8.

A further aspect of the invention is directed to an arrangement by which the sensor in the cassette-receiving machine for controlling operation of the recording circuitry and mechanism may be is triggered either to record on the inserted cassette or to preclude recording on the cassette. As shown diagrammatically in FIG. 2, the recording/playback machine includes a sensor 92 which may be moved rearwardly in response to insertion of the cassette into the machine. In most commercially available machines, when the cassette is inserted into the machine, a tab on the cassette abuts the sensor 92 and urges it rearwardly to activate the recording circuitry of the machine. The tab is constructed so that it may be broken away easily from the cassette. Once the tab has been broken away, insertion of the cassette into the machine will not actuate the sensor 92 and the information already stored on the tape cannot be erased or recorded over. As mentioned above, the primary disadvantage of this arrangement is that once the cassette has been rendered non-recordable, this configuration cannot be reversed. In contrast, the invention includes a reversible device for actuating the sensor 92 when desired without rendering the cassette permanently non-recordable.

Figure 4:
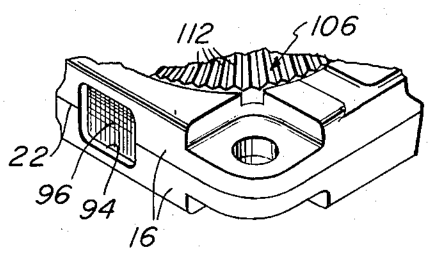
FIG. 4 is an illustration of a rearward corner of the cassette showing the opening receptive to the sensor in the machine for controlling operation of the recording function of the machine.
Figure 5:
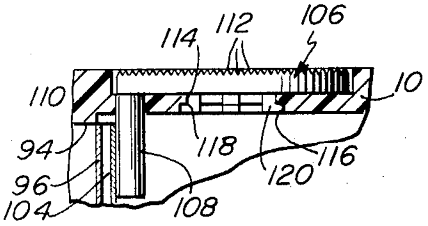
FIG. 5 is a section taken through the actuator for the window as viewed along the line 5—5 of FIG. 1.

As shown in FIGS. 4 and 5, the rear wall 16 is provided with a window 94 in each rear corner region of the cassette. The window 94 is disposed so that it will register with the sensor 92 which ordinarily is in a standard location in the machine. The window 94 is maintained in a normally closed configuration by a thin, resilient leaf spring 96 which is secured against and along the inner surface of the rear wall 16. The leaf spring 96 is maintained firmly in place by a pair of pins 98 which are formed integrally with the top or bottom wall of the cassette. The central portion of the leaf spring 96 is formed to define a pair of longitudinally spaced shoulders 100 which engage the pins 98 to retain the spring 96 in place and to preclude any longitudinal shifting of the spring. The free ends of the leaf spring 96 cover the windows 94 from the inside of the cassette and also have inwardly reverted ends 102 on which are formed a pair of spaced ribs 104. The leaf spring 96 is designed so that it will flex inwardly when the window-covering end is engaged by the sensor 92 in the recording/playback machine. The sensor 92 thus will not be urged rearwardly and the recording circuitry of the machine will be unactivated.

When it is desired to actuate the sensor 92 to record on the tape in the cassette, the end of the leaf spring 96 is supported firmly from within so that it will not yield when engaged by the sensor 92. This arrangement includes a disc 106 which is rotatably supported in the top or bottom wall 10, 12 and which has an integrally formed, inwardly extending lug 108 near its periphery. An arcuate slot 110 is formed in the wall to receive the inwardly extending lug 108 and to permit the disc 106 and lug 108 to be rotated through an arc defined by the limits of the arcuate slot 110. The slot 110, lug 108 and disc 106 are arranged so that the lug may be pivoted into engagement with the inside of the end of the leaf spring and be retained between the ribs 104 of the leaf spring 96. This effectively provides firm backing for the end of the leaf spring and resists inward flexing of the spring 96. When in this position, insertion of the cassette into the recording/playback machine will actuate the sensor 92 and permit recording on the tape. If it is desired to preclude recording, then the disc may be pivoted to a position in which the lug 108 is out of engagement with the leaf spring which permits the leaf spring to flex inwardly when it engages the sensor 92.

The disc preferably includes indicia associated with the external surface of the top or bottom wall 10, 12 to provide a visual indication of the position of the lug 108 thus enabling one to determine from the exterior of the cassette whether or not it is in a recording mode. The external surface of the disc 106 preferably is formed with a plurality of ridges 112 to facilitate manual rotation of the disc.

As shown in FIG. 5, the disc 106 is retained within a hole in the wall of the cassette, the hole being countersunk at one end 114 and counterbored at the end 116 to define the tapered lip 118. The disc 106 is formed from a relatively soft, flexible plastic having an outer periphery which is complimentary to the hole in the wall. When assembling these parts, the complimentary hub 120 of the disc 106 is simply snapped into the hole and thereafter is retained in place by engagement of the tapered lip 118 about the hub 120.

Figure 9:
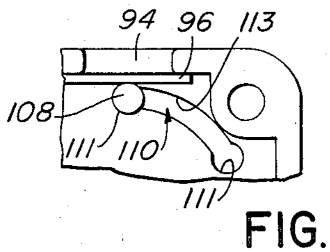
FIG. 9 is an illustration of an alternative arrangement for obstructing the sensor window.

An alternative arrangement for locking the disc 106 in either of the two positions is shown in FIG. 9 and includes the formation of an arcuate slot 110'. The slot 110' has enlarged end portions 111 and a narrow portion 113 extending between the end portions 111. The narrowed portion 113 is slightly smaller than the diameter of the lug 108 so that it tends to restrict rotation of the disc between either of the extreme positions. This causes a snapping effect when the disc is rotated to pivot the relatively soft lug 108 to either of the two positions. With this arrangement, the end of the leaf spring 96 need not be formed to receive the lug but, instead, need only be flat as shown. Additionally, the snapping effect provided when the lug 108 engages either end of the slot effectively retains the lug 108 in the desired position until it is changed intentionally.

Figure 10:
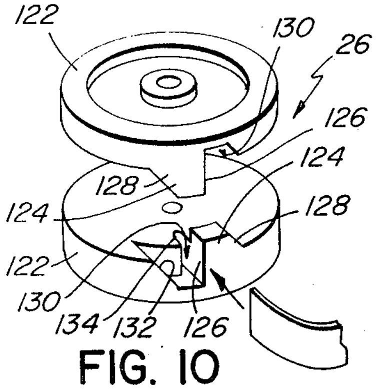
FIG. 10 is an exploded illustration of the tape reel.
Figure 11:
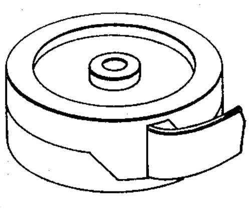
FIG. 11 is an illustration of the assembled tape reel.

The invention also includes improved construction for the tape reels 26 which avoid any gaps about the periphery of the reels. This precludes the formation of any flats or creases on the tape as the tape is wound about the reel. As shown in FIGS. 10 and 11, the tape reel is formed from a pair of circular sections 122. Each section includes a boss 124 which defined in part by a radial surface 126. Each boss 124 also includes an inclined wedge surface 128. Each of the circular sections 122 includes a void 130 which is complimentary to the boss on the other section. The void including an inclined surface 132 which cooperates with the inclined wedge surface 128 on the boss of the other, mated section. The radial surfaces 126 of the circular sections 122 are spaced to define a slot which is receptive to the free end of the tape as shown. When the circular sections 122 are urged together axially, the cooperation between the wedge surfaces 128, 132 twist the sections to close the slot and grip the end of the tape between the radial surfaces 126. The assembled circular sections of the reel then may be secured to each other by ultrasonic or other conventional techniques. The grip on the end of the tape may be increased substantially by providing an additional supplemental radial slot 134 on each of the circular sections 122 in a position such that when the sections have been locked together, the supplemental radial slots 134 are out of registry. This constrains the extreme end of the tape in a Z-shaped configuration which enhances the grip on the tape. The tape reel so constructed avoids any spaces or gaps about the winding surface of the reel.

In the preferred embodiment of the invention, the outer surface of the top and/or the bottom walls 10, 12 are formed to present a substantially flat surface on which a label or other matter may be imprinted directly. This is in contrast to the commonly accepted technique for providing a depressed area on the outside of the cassette which receives a previously imprinted label. By forming the region to be labeled at the same height or at least not below the height of any other surface on the outside of the cassette, the label can be imprinted directly on the exterior of the cassette with ease. Any regions on the exterior surface of the cassette which are not to be imprinted, may be recessed slightly from the surface which is to be imprinted. For example, most cassettes include a central window 136 to permit the wound tape to observed for determination of the length of tape which has been recorded or played. Indicia may be molded into the exterior surface of the cassette along the window 136 to provide a measurement of the length of time remaining on the supply reel. This entire region including the drive spindles on the recording/playback machine preferably is recessed below the level of the external surface which is to be imprinted. Thus, after the exterior surface has been imprinted, the central depression including the foregoing elements is unmarked.

Thus, I have provided an improved cassette construction which avoids many of the difficulties found in currently available cassettes. It should be understood, however, that the foregoing description of the invention is intended merely to be illustrative thereof and that other embodiments and modifications will be apparent to those skilled in the art without departing from its spirit.

Having thus described the invention, what is claimed is:

1. In a tape cassette adapted to be inserted into a machine having a sensor movable in response to a force of a predetermined magnitude, for controlling the actuation of a portion of said machine, the improvement comprising:

a selected element mounted to said cassette so that said selected element will be in alignment with said sensor when said cassette is inserted into said machine, said selected element being biased toward an actuating position in which said selected element will be presented to and will engage said sensor when said cassette is inserted into said machine, under a force less than said predetermined magnitude; and locking means mounted to said cassette and being movable between a first position in which said locking means engages and rigidifies said selected element in said actuating position and a remote position out of engagement with said selected element.

2. A tape cassette as defined in claim 1 further comprising:

said cassette having a window formed in a wall thereof, said window being receptive to said sensor on said machine when said cassette is inserted into said machine; and means mounting said selected element within said cassette so that it is exposed through said window, said actuating position of said selected element being toward said window.

3. A tape cassette as defined in claim 2 wherein said selected element comprises:

a leaf spring secured within said cassette and having a free portion thereof in registry with said window whereby said selected element is self-biased.

4. A tape cassette as defined in claim 3 wherein said means for locking said selected element in said actuating position comprising:

a lug mounted within said cassette for movement toward and away from the free end of said spring; and means exposed exteriorly of said cassette for effecting said movement of said lug.

5. A tape cassette as defined in claim 4 wherein said means for effecting said movement of said lug comprises:

a disc rotatably mounted in generally flush relation to a wall of said cassette, said lug being secured to the internal surface of said disc and projecting interiorly of said cassette, said disc and said lug being located so that said disc may be pivoted to rotate said lug between said positions thereof.

6. A tape cassette as defined in claim 5 wherein said lug is confined to movement between said positions by an arcuate slot formed in said disc-supporting wall, said lug projecting through said arcuate slot.

7. A tape cassette as defined in claim 5 wherein said means mounting said disc to said wall comprises:

a circular hole formed in said wall, said hole being defined by a thin, circumferential lip; and said disc having an annular groove formed about its periphery, said groove being adapted to receive said lip, said disc being formed from a soft, resilient material to enable said disc to be snapped into said hole with said groove and said lip in mating relation.

8. A tape cassette as defined in claim 5 further comprising:

means forming ribs on the internal surface of said end of said spring, said ribs being engagable by said lug to retain said lug under a resilient force when said lug is in said actuating position.

9. A tape cassette as defined in claim 5 further comprising:

said lug being confined to movement between said positions by an arcuate slot formed in said disc-supporting wall, said lug projecting through said arcuate slot;

said slot having enlarged portions at the extreme ends thereof and an intermediate portion of reduced dimensions, said intermediate portion being of slightly smaller dimensions than those of said lug whereby said lug may be retained firmly within either of said extreme positions.

* * * * *